July 14, 1970 C. H. ANDERSON 3,520,745

ETCHING OF GOLD ALLOY ENCODER DISCS

Filed Dec. 19, 1966

INVENTOR.
Charles H. Anderson
BY
Shenier & O'Connor
ATTORNEYS

United States Patent Office 3,520,745

Patented July 14, 1970

3,520,745

ETCHING OF GOLD ALLOY ENCODER DISCS

Charles H. Anderson, New Fairfield, Conn., assignor to United Aircraft Corporation, East Hartford, Conn., a corporation of Delaware

Filed Dec. 19, 1966, Ser. No. 602,860
Int. Cl. B44c *1/22;* C23f *1/02*
U.S. Cl. 156—3 9 Claims

ABSTRACT OF THE DISCLOSURE

A method of etching gold foil to provide a high resolution, accurate conductive pattern in which the etching step is interrupted at a critical time, the body is dipped in a solvent to dissolve etchant resistant salts formed in the course of the etching operation, and the etching operation is subsequently completed.

BACKGROUND OF THE INVENTION

There are many instances in which it is necessary to apply a pattern of conductive material to a substrate with a high degree of accuracy. One instance wherein such a pattern is required is on the coated discs of a miniature shaft position encoder. A pattern of this type usually includes a plurality of concentric circles of conductive segments separated by non-conductive spaces and connected by rings of conductive material. It will readily be appreciated that the more accurately a pattern of this type can be produced, the higher degree of resolution the device may have. This of course is desirable since the device should be as small as is practicable.

In devices of the type described above base metals have not proved satisfactory for the formation of conductive patterns owing to the fact that they oxidize relatively readily and consequently generate excessive noise after an inordinately short period of time in use. To overcome this problem it has been proposed that noble metals be used to form the pattern.

Various methods have been suggested in the prior art for the production of noble metal conductive patterns on a substrate. One method which has been proposed is electroplating of noble metals or alloys thereof onto a previously formed pattern of a base metal. This method has not, however, proved as satisfactory as is desirable. First, an alloy possessing the optimum combination of desirable characteristics cannot successfully be plated. In addition, the deposit has a tendency to become contaminated by salts and the like from the plating solution. Further, the plating operation generally results in some loss of pattern accuracy and line definition.

In order to overcome the defects of the plating operation, it has further been proposed that a foil of a wrought noble metal alloy first be bonded to the substrate on which the pattern is to be produced and that the foil then be etched to provide the desired pattern. This method permits of the use of an alloy foil having the optimum combination of desirable properties, such as hardness, resistance to corrosion and uniformity of thickness. While the etching of foil to provide the pattern would be thought to be an entirely satisfactory solution to the problem of providing a highly accurate pattern of conductive material, it has been found in practice that the rate at which etching is carried out is inhibited after a period of time, thus deleteriously affecting the resultant pattern. Moreover, the etching process as practiced in the prior art is a relatively critical process which must carfeully be controlled to produce the desired result.

I have invented a process for etching a noble metal foil which overcomes the defects of etching processes of the prior art. My process permits the etching operation to be carried on rapidly and in an expeditious manner. The pattern produced by my etching process is more accurate and has better line definition than do patterns produced by processes of the prior art.

SUMMARY OF THE INVENTION

One object of my invention is to provide a process for etching a noble metal foil which overcomes the defects of etching processes of the prior art.

Another object of my invention is to provide a process for etching a metal foil which permits the etching operation to be carried out rapidly and in an expeditious manner.

A further object of my invention is to provide a process for etching a noble metal foil to produce a pattern which is more accurate and which has better line definition than do patterns produced by methods of the prior art.

Still another object of my invention is to provide a process for etching a noble metal foil to produce a pattern with straighter walls permitting the pattern to be resurfaced with dimensional stability.

Other and further objects of my invention will appear from the following description.

In general my invention contemplates the provision of a method of making an element, such as an encoder disc, carrying a conductive pattern having superior line definition and high resolution in which I first bond a gold alloy foil to a substrate, such as aluminum, having an anodized surface. After forming a resist pattern of the desired conductive pattern on the foil surface, I then begin the etching operation by applying an etchant to the exposed metal. After about three minutes and before about four minutes, I remove the article from the etchant, wash it and dip it in a suitable solvent to dissolve silver chloride salt formed during the etching operation. When the salts have been dissolved, I remove the article from the salt solvent bath, wash it and complete the etching operation. After etching I remove the resist pattern and perform the necessary finishing operations on the disc.

BRIEF DESCRIPTION OF THE DRAWINGS

In the accompaying drawings which form part of the instant specification and which are to be read in conjunction therewith and in which like reference numerals are used to indicate like parts in the various views.

Description of the preferred embodiments

Figure 1:
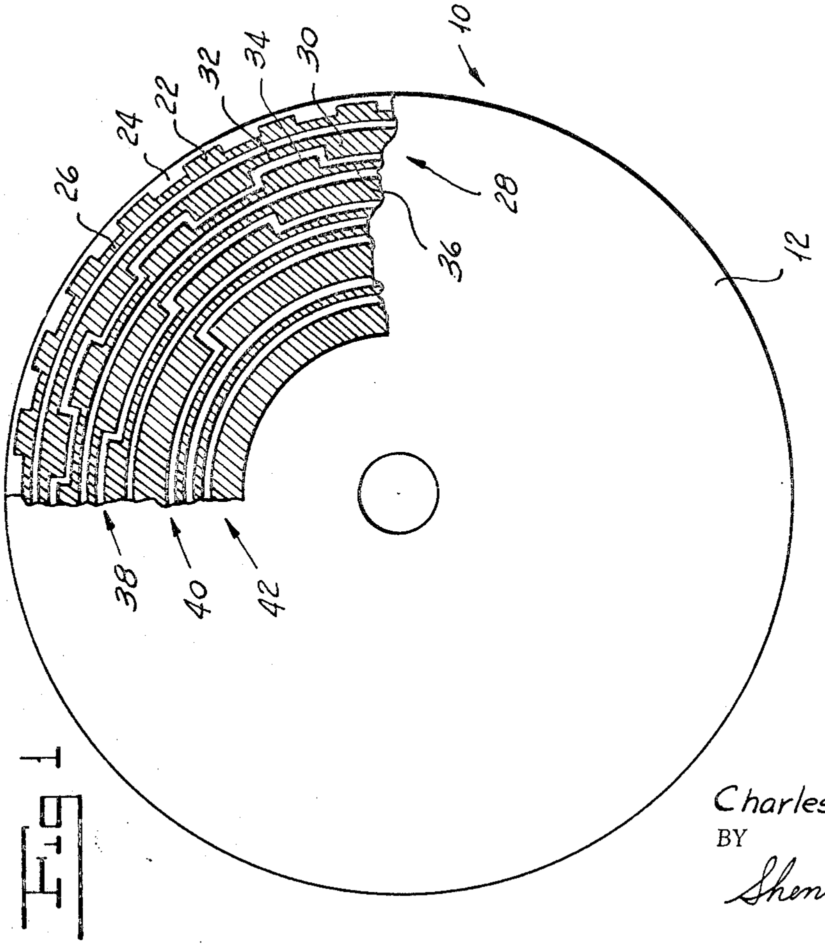
FIG. 1 is a plan view of an encoder disc showing a pattern thereon, most of which has been broken away.
Figure 2:
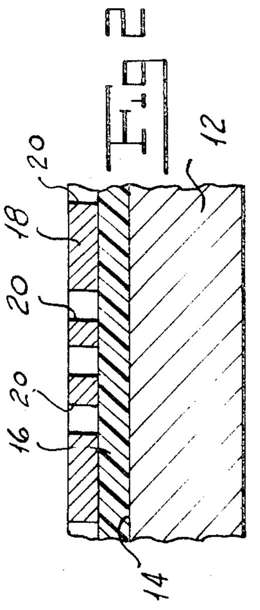
FIG. 2 is a fragmentary sectional view of an encoder disc illustrating the bonded layers thereof.

Referring to FIGS. 1 and 2, one article which may be made by my method is an encoder disc, indicated generally by the reference character 10, and comprising a substrate 12 of a suitable material such, for example, as aluminum. The thickness of the aluminum may, for example, be about 0.0100 in. The disc may have a diameter of, for example, 1.358 inches. The substrate 12 has an anodized surface 14 which will withstand about 500 volts D.C. A layer 16 of a suitable bonding film to be described hereinafter bonds an alloy foil 18 to the surface 14 of the substrate 12. When they are applied in the manner to be described hereinbelow, each of the layers 16 and 18 has a thickness of about 0.002 in. Following the assembly operations, the thickness of the bonding film 16 is reduced to about 0.001 in.

By the etching operation to be described, foil 18 is etched to provide a plurality of openings 20 forming the desired pattern on the disc. These openings 20 are filled in a manner to be described with a suitable insulating material to form a pattern of conductive elements separated by non-conductive spaces.

In one particular pattern which I may form by practice of my method, I provide an outer ring of conductive elements 22 separated by non-conductive spaces 24 and connected by a commutator ring 26. This ring of circles or segments 22 may correspond to the least significant bit place of an encoder. I provide a next-to-least significant row, indicated generally by the reference character 28, comprising alternate conductive segments 30 connected by a commutator ring 32 and other conductive segments 34 connected by a ring 36. Other rows indicated generally by the reference characters 38, 40 and 42 may be formed. These further rows correspond to bits in increasing order of significance. While I have illustrated a particular conductive pattern in FIG. 1, it will readily be appreciated that this is by way of example only. I may apply my method to any device requiring extremely good line definition and high resolution for the pattern of conductive elements.

The first operation to be accomplished in my process of making an encoder disc is the operation of bonding the foil 18 to the surface 14 of the substrate 12 by means of the binder layer 16. As has been pointed out hereinabove, the substrate 12 may, for example, be aluminum, the surface of which has been anodized by any method known in the prior art so that it withstands up to about 500 volts D.C. For the alloy foil 18 I select an alloy of noble metal such, for example, as a wrought gold alloy. The composition of the alloy I employ is between about 70% and about 73% by weight of gold, between about 3% and about 8% by weight of silver, between about 7% and about 10% by weight of platinum, between about 13% and about 16% by weight of copper and up to about 2% by weight of zinc. A particular alloy with which I have successfully produced a disc having the desirable properties described above is made up of 71.5±1% of gold; 8.5±½% of platinum; 4.5±½% of silver; 14.5±1% of copper and 1%+0.2%, −0.5% zinc and about 0.2% impurities. This alloy for a 100 gram load demonstrates a hardness of 290 to 380 Knoop. The ultimate tensile strength is 180,000 p.s.i. The thickness tolerance is between +0.003, −000 inch. Its parallelism should be 0.0001 inch per foot.

Having selected an alloy possessing the required optimum combination of desirable characteristics, I next select an appropriate bonding agent 16 for adhering the foil 18 to the substrate 12. Preferably I employ an unsupported thermosetting structural film adhesive of the nitrile phenolic type. For example, I may employ "SCOTCH-WELD" Brand Bonding Film AF–31, manufactured by Minnesota Mining and Mfg. Co. of St. Paul, Minn.

Having selected both the alloy foil and the adhesive, I next shear the gold foil to the proper length allowing some excess on each side of the pattern. I then degrease both the substrate 12 and the foil in a manner known to the art. Next I cut the bonding tape to the size of the surface 14 of substrate 12. I apply the film 16 adhesive side down to the surface 14 and using a rubber roller on the protective liner, I remove any entrapped air.

Before applying the foil 18, I perform a preliminary etching operation thereon for good adhesion of the foil to the film 16. I have discovered a number of different etchants which are suitable for use both in the surface preparation etching operation and in the pattern etching operation to be described. For example, I may employ a combination of sodium chloride, nitric acid and water. Alternatively, sodium chloride, nitric acid, hydrochloric acid and water can be used. A third etchant which could be used is made up of magnesium chloride, nitric acid, hydrochloric acid and water. I employ the etchant in a temperature range of from about 25° to about 60° C. Specifically the range of etchants in mols per liter of water may be as follows:

| | Mols per liter |
|---|---|
| 1. Sodium chloride ($NaCl$) | 0.9–4.3 |
| Nitric acid ($HNO_3$) | 3.0–6.0 |
| 2. Sodium chloride ($NaCl$) | 0.6–4.0 |
| Nitric acid ($HNO_3$) | 3.0–6.0 |
| Hydrochloric acid ($HCl$) | 1.0–3.0 |
| 3. Magnesium chloride ($MgCl_2 6H_2O$) | 0.6–4.0 |
| Nitric acid ($HNO_3$) | 3.0–6.0 |
| Hydrochloric acid ($HCl$) | 0.5–3.0 |

A particular etchant which I have successfully employed for treating the surface of the foil and for performing the etching operation to be described is made up of 1.56 mols per liter of sodium chloride, 4.63 mols per liter of nitric acid and 1.83 mols per liter of hydrochloric acid. The hydrochloric acid which I use has a concentration of from about 69% to about 71%. To perform the step of preparing the foil surface for bonding, indicated by the block 44 in FIG. 3, I place the degreased foil in a suitable fixture and immerse in the etchant for a period of from about 15 to about 20 seconds. The etched surface is rinsed and wiped with a dental roll saturated in distilled water and then is rinsed under running distilled water. Following that operation, I dry the surface with clean air or with nitrogen and dry the foil in an oven at 60° C. for about 10 minutes.

Before applying the treated foil I strip the liner from the binder material 16 and position the foil on the exposed surface using tweezers or the like. I then take a clean rubber roller and roll it over the exposed gold surface. Having placed the bonding film 16 and the foil 18 in superposed relationship on the substrate 12, I then perform the bonding or laminating operation, indicated by the block 46 in FIG. 3. This operation may be performed on a heated platen press, for example. I first heat the press to a temperature of 350° F.±10° and place the laminated assembly between flat parallel ground platens and place the assembly and the platens in the press. When the bond line temperature reaches between about 170° and about 250° F. I apply 1,000 p.s.i. pressure. The assembly is cured for 60 minutes at a pressure of 1,000 p.s.i. and at a temperature of about 350° F. With the assembly still under pressure, the platens are cooled to a temperature of 150° F. or less and the assembly is removed from the press. The assembly is then wiped with a suitable degreasing agent and is scrubbed clean with a suitable cleanser, such as a mixture of a synthetic detergent, abrasive material and alkali, manufactured and sold by Colgate Palmolive Co. under the trademark "Ajax," until the gold is water-break clean. I then check the assembly for short circuits with 500 volts D.C. It should provide a minimum megger value of 10 megohms.

When the assembly of the fold foil 18 has been laminated with the substrate 12 by use of the bonding film 16 in the manner described, it is ready for the application of a resist pattern. Before applying the resist pattern, I prepare the exposed surface by subjecting it to a preliminary etching operation of the type described above. The part is placed in the etching fixture and immersed in the etchant for from 25 to 30 seconds at between about 30° and about 35° C. It is then rinsed in distilled water, wiped with a dental roll saturated in distilled water and further rinsed under running distilled water. It is blown dry with nitrogen or clean air and oven-dried for 15 minutes at about 60° C. The part then is cooled to room temperature. I have indicated the operation of preparing the surface of the foil to receive a resist by the block 48 in FIG. 3.

In order to form the resist pattern I use a suitable photo-sensitive material such, for example, as Kodak Metal Etch Resist, manufactured and sold by Eastman Kodak Company of Rochester, N.Y. In order to apply the resist I place the assembly on a whirler in a dust free atmosphere. The resist is poured into the center of the surface and allowed to run to the edge without actuating the whirler. The whirler is then rotated slowly to cause the resist to build up at the edges. Rotation is stopped to allow the resist to level off and the operation is repeated again and the result is checked for voids or air bubbles in the resist. Then the whirler is rotated at a speed determined by the size of the part for about four minutes to produce a light-sensitive coating. It will be appreciated that parts having this coating should be kept in a safe light area. The parts are first air-dried at room temperature for 15 minutes, then dried for 30 minutes in a circulating air oven at a temperature of from about 123° C. to about 125° C and finally are cooled at room temperature. This operation is indicated by the block 50 in FIG. 3.

Figure 3:
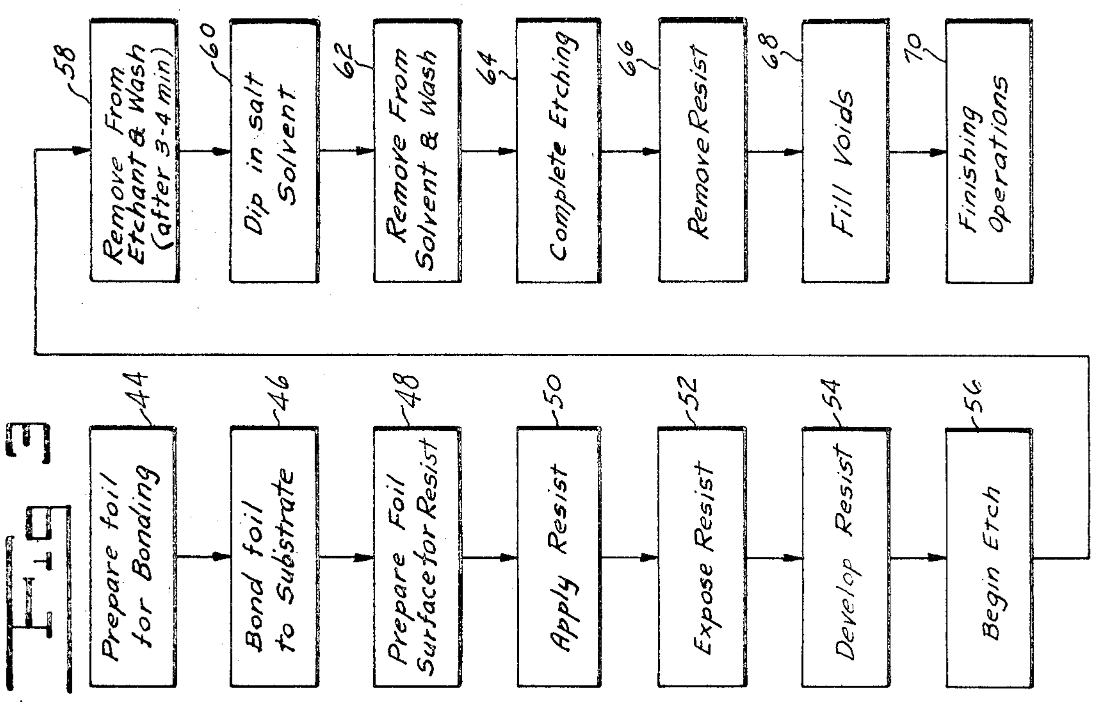
FIG. 3 is a block diagram of the steps I employ in my method of making an encoder disc.

After the photo-sensitive resist film has been applied in the manner described, it is next exposed to a negative light pattern of the pattern it is desired to produce. This can be achieved on a suitable device, such as a Nu-Arc printer in about two or three minutes. Block 52 of FIG. 3 illustrates this step. When the film has been exposed, the exposed areas are developed using a Kodak Metal Etch Resist developer, produced and sold by Eastman Kodak Company, by spraying the film with a developer in a fume hood for about 1¾ to 2 minutes. The pattern is then dried with clean air or nitrogen, care being taken not to blast the pattern. I then air dry the part at room temperature for 10 minutes followed by a forced air oven cure at a temperature of from about 180° and 200° C. for 10 minutes. The pattern is checked for defects such as unwanted resist and voids and is touched up as necessary. I have indicated this step by the block 54 in FIG. 3.

From the operations so far described, it will be appreciated that I have produced a substrate to which a noble metal foil 18 has been bonded by a bonding agent 16. The foil carries a resist pattern which corresponds to or has a positive of the desired metal pattern for the part such as an encoder disc to be produced. I next begin the operation of etching away the unwanted metal of the foil 18 in the regions 20 as indicated by the block 56 in FIG. 3. I accomplish this operation by use of any of the etchants outlined hereinabove. The part is placed in the fixture pattern side down and is lowered into the etchant in such a way as to ensure that no air is trapped on the pattern. The etching operation should be carefully timed.

I have discovered that in processes of the prior art the etching operation is inhibited by formation of silver chloride salt during the etching cycle. Further, these salts in processes of the prior art so affect the etching operation as to result in line definition which is not as sharp as is desirable and in a relatively low resolution pattern. Moreover, these salts increase the etching time. I overcome these defects of the processes of the prior art by interrupting the etching operation at a critical time and removing the silver chloride salt. I have discovered that in order to obviate the undersirable results flowing from the formation of these salts in the prior art, the etching operation should not be interrupted before about three minutes or the salts will form to such an extent as to produce the undesirable results noted above after the dissolution step. Moreover, the operation of removing the salts must be begun before about four minutes after the etching operation is commenced or else the etching operation already has been retarded to an undesirable degree.

In accordance with the foregoing, preferably at about three minutes from the time at which the etching operation was begun and before about four minutes from that time, I remove the part from the etchant and wash it with distilled water as indicated by the block 58 in FIG. 3. I then dip the washed part in a salt solvent, as indicated by the block 60 in FIG. 3, for a few seconds to dissolve the salt. I have found a suitable salt solvent to be a 58% solution of ammonium hydroxide having a specific gravity of about 0.902. Other solvents which might be employed are sodium thiosulfate and potassium cyanide. When the silver chloride salts have been removed, I remove the part from the solvent, again wash it in distilled water, as indicated by block 62, and return it to the etchant to complete the etching operation as indicated by the block 64. After about five more minutes, the etching operation is complete, the part is rinsed in distilled water and dried. I visually observe this etching operation.

As I have just described, I interrupt the etching operation at about three minutes after it is begun and subject the assembly to the action of a solvent to dissolve silver chloride salts formed during the etching operation. I then complete the etching operation by subjecting the assembly to the action of the etchant for about five more minutes. It might be thought that salts formed during this further etching would deleteriously affect the operation. I have found, however, that such is not the case, but that salts formed during the terminal portion of the etching operation fall away from the assembly. A possible explanation of this phenomenon is that salts formed during the initial portion of the etching operation tend to adhere to the undersides of the edges of the resist pattern, which is slightly undercut by the etchant, to permit a buildup of salts. When, however, this salt deposit is removed, salts formed by further action of the etchant on the metal below the surface of the foil do not have the same tendency to adhere but, as a matter of fact, drop off. In any event I have discovered that the salts formed during the terminal portion of my etching operation do not deleteriously affect the end product.

After the areas 20 of the foil 18 have been etched, I remove the resist by wiping the part with a suitable agent such, for example, as any degreasing agent known to the art. The part then is scrubbed, inspected and checked for electrically shorted tracks. I have indicated the resist removal step by the block 66 in FIG. 3.

Where I employ my method to make an article such, for example, as the encoder disc illustrated in FIG. 1, desirably the recesses 20 are filled with an insulating material to provide a smooth plane surface over which contact brushes (not shown) can move without bouncing. The operation of filling these voids to provide such a surface is known as "flushing." Various ways of performing this flushing operation are known to the art. For example, pelletized or granulated, partially cured thermosetting resin may be placed on the etched surface and heat and pressure can be applied to cause the resin to flow into the recesses. Preferably, however, I use the material from which I form the bonding film 16 to achieve the flushing operation. In so doing I first cut the material to a diameter slightly larger than that of the pattern of conductive material 18. I next apply the material on the pattern and roll it with a rubber roller. Then the protective liner is removed. I place the resultant assembly between ground platens of the same type as those employed in the foil bonding operation. I treat the platens with a suitable release agent. When the article has been placed between the platens, I position the assembly in a vacuum chamber and subject it to 30 inches of vacuum for about ten minutes. Subsequently the plates and the device are removed from the chamber and placed in a platen press which has been preheated to about 400° F.±5°. Contact pressure is applied and when the bond line temperature reaches a temperature of between about 170° and about 200° F. the pressure is increased to 2,000 p.s.i. for about one hour. Under these conditions the resinous material flows into the recesses 20. The assembly is cooled while under pressure and after the temperature has dropped to about 150° F. or less, the assembly is removed from the press. I polish the surface with a suitable polishing paper to remove the excess resinous material. I then perform the post-curing operation at about 200° C. in a circulating air oven for one hour. Finally suitable finishing operations, such as polishing the surface with an abrasive slurry, are performed. I have indicated the flushing operation and the finishing operations by respective blocks 68 and 70 in FIG. 3.

In summary, in the practice of my method of forming a high resolution, conductive pattern of noble metal, I select a suitable foil, such as the wrought gold alloy foil 18, described hereinabove. After a preliminary etching operation to prepare the undersurface of the foil for bonding as indicated in block 44, I bond the foil to the substrate in the manner described above by use of a suitable thermosetting resin, such as the film 16. Having performed the bonding operation indicated by block 46, I perform a preliminary etching operation on the outer surface of the foil to prepare it to receive the resist. As indicated by the blocks 50, 52 and 54, I then apply a suitable photo-sensitive resist, such as Kodak Metal Etch Resist, to the outer surface of the foil, then expose the photo-sensitive resist to a positive of the pattern to be applied, and then develop the resist.

After I have developed the resist pattern, I begin the etching operation, as indicated by block 56, by placing the device in a suitable fixture and immersing it in the etchant. I may use any one of the particular etchants described above. As I have pointed out, I have discovered that the difficulties arising in etching processes of the prior art are the result of the formation of silver chloride salt by the action of the etchant on the alloy foil. At a critical time in the course of the etching operation, which preferably is at about three minutes after but before four minutes from the beginning of the etching operation have elapsed, I remove the article from the etchant and wash it as indicated by block 58. I then dip the article in a solvent solution to dissolve the salts as indicated by block 60 and then complete the etching operation as indicated by block 64 after having washed the article. I have discovered that the dissolution of the salts greatly expedites the etching operation and results in a pattern having a higher resolution and much superior line definition than do patterns produced by the process known in the prior art.

When the etching operation is finished I remove the resist, perform the flushing operation and the finishing operations as indicated, respectively, by the blocks 66, 68 and 70.

While I have described my process as being used in connection with the production of an article such as the encoder disc 10, it will readily be appreciated that it is equally applicable to any article which requires the formation of a noble metal conductive pattern having a high resolution and good line definition. Moreover, it is equally applicable to devices which do not require the flushing operation described hereinabove.

It will be seen that I have accomplished the objects of my invention. I have provided a process for etching noble metal films which overcomes the defects of etching processes known in the prior art. My method greatly expedites the etching operation. It provides a pattern having a higher resolution and far superior line definition than do patterns produced by methods of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of forming a pattern of an alloy comprising gold and silver including the steps of supporting a thin layer of said alloy, first etching away unwanted alloy in the shape of the negative of said pattern to a depth less than the thickness of said thin layer with a chloride bearing etchant for no longer than about three minutes, removing undesirable silver chloride formed during said etching operation within about a minute thereafter and then etching away the remainder of the alloy in the shape of said negative to leave said pattern of said alloy.

2. A method as in claim 1 in which said removing step comprises first washing said thin layer then subjecting it to a solvent for said silver chloride and then again washing said layer.

3. A method as in claim 1 in which said thin layer is a foil and in which said supporting step comprises bonding said foil to a substrate.

4. A method as in claim 1 in which said etching step comprises forming a photo resist pattern on the surface of said layer.

5. A method as in claim 1 including the step of filling the openings formed by said etchant with an insulating material.

6. A method as in claim 1 in which said solvent is ammonium hydroxide.

7. A method as in claim 1 in which said etchant comprises sodium chloride and nitric acid.

8. A method as in claim 1 in which said etchant comprises sodium chloride, nitric acid and hydrochloric acid.

9. A method as in claim 1 in which said etchant comprises magnesium chloride, nitric acid and hydrochloric acid.

References Cited

UNITED STATES PATENTS 3,177,103 4/1965 Tally et al. ---------- 156—3

FOREIGN PATENTS 869,823 6/1961 Great Britain.

JACOB H. STEINBERG, Primary Examiner

U.S. Cl. X.R.

117—232; 156—18